Jan. 26, 1932.   G. A. SCHETTLER   1,842,491
MARKING MACHINE
Filed Sept. 13, 1926   5 Sheets-Sheet 3

INVENTOR
Gustav A. Schettler
By his Attorney
Nelson W. Howard

Jan. 26, 1932.　　　G. A. SCHETTLER　　　1,842,491

MARKING MACHINE

Filed Sept. 13, 1926　　　5 Sheets-Sheet 5

INVENTOR
Gustav A. Schettler
By his Attorney
Nelson W. Howard

Patented Jan. 26, 1932

1,842,491

UNITED STATES PATENT OFFICE

GUSTAV ADOLF SCHETTLER, OF LEEDS, ENGLAND, ASSIGNOR TO THE TURNER TANNING MACHINERY COMPANY, OF PORTLAND, MAINE, A CORPORATION OF MAINE

MARKING MACHINE

Application filed September 13, 1926, Serial No. 135,009, and in Great Britain September 29, 1925.

This invention relates to marking machines and is illustrated as embodied in a machine especially adapted for use with an area measuring machine to print upon the measured material numbers corresponding to measurements obtained by the measuring machine. It is to be understood, however, that the invention is not limited to use with measuring machines but that various important features of the invention may have other applications and uses.

In marking machines as heretofore constructed for use with measuring machines some of the operating parts have been so constructed as to permit of an amount of lost motion which resulted in undesirable vibration and even backlash in the parts. Furthermore, in certain prior constructions, the capacity of the marking machine was limited to the marking or printing of numbers within the range of the dial and pointer of the measuring indicator mechanism as determined by one circuit of the pointer over the dial. For instance, the marking machine of such prior constructions would not operate to mark the number 40 on a piece of work if the pointer in its circuit once around the dial could indicate at its maximum the number 30 only.

It is an object of the invention to provide a simple yet durably constructed machine for the marking of pieces of material which will be more positive in its action and, therefore, more accurate because free from backlash and undesirable vibration of the parts. It is a further object of the invention to provide a marking machine of greater marking range than those heretofore provided for use with leather measuring machines, while at the same time minimizing the number of parts of the machine.

To these ends and in accordance with important features of the invention there is provided, in an area measuring machine, means under the control of the operator for conditioning the marking means to vary the normal selecting movement of the marking means so as to widen the range of marking operations. In the illustrated construction, operation of means for selecting proper type blocks to mark the material in accordance with a measurement by the measuring means is controlled to take place automatically after the marking means has been rendered capable of a wider range in marking operations than that indicated by the pointer in a single circuit of the dial in the indicator means of the measuring machine. Convenently, a manully operable member is employed for adjusting preliminarily a part of the type block selecting means with respect to a controlling cam for the marking means so that the preliminary adjustment is added to the movement of the selecting means secured as a result of the power operation of the marking means. As illustrated, a plurality of plungers and a plurality of levers connected each to its respective plunger serve as connecting means between the controlling cam of the marking means and a plurality of sets of type selecting or setting means by which the latter upon operation are moved to place one block of each set at a time in selected position. In one of these connecting means the lever provided is a two-part lever connected with its associated plunger and adapted to be adjusted by the described manually operable member for setting one part of the lever in selected relation with respect to the other part whereby the associated plunger is preliminarily adjusted with respect to the controlling or setting cam for the marking means in an advanced relation thereto, the advance movement of the connecting means thus secured corresponding to the amount of the measurement of the material in excess of that indicated by the pointer of the indicator means in a single circuit over the dial of said indicator.

Another feature of importance relates to improved means for selecting the type for printing or marking of the material wherein connections between a selecting means and a controlling or setting cam of the marking means comprise plungers, and levers directly connected thereto and adapted to move substantially as a single unit with the plungers thereby minimizing vibration or backlash in the connections through which the selecting means are controlled to move to operative position the type blocks utilized in printing or marking on the piece of work.

Other features of the invention relate to improved means for applying ink to the selected type blocks as a preliminary to a printing or marking operation. In the illustrated construction this means comprises an oscillatory member yieldingly connected to an inking roll and positively operated to travel back and forth in a predetermined path to pass the inking roll over the type in marking position only, during oscillatory movements of the inking roll between ink-receiving and ink-applying positions. Preferably and as shown, the inking roll during its oscillation about its axis moves in a straight line while applying the ink to the type block.

These and other features of the invention will be described in detail in the specification and pointed out in the appended claims.

In the drawings,

Fig. 6 shows a detail hereinafter particularly referred to;

Figures 1, 2, 7 and 8 are drawn to a smaller scale, and Figures 9 and 10 to a larger scale, than Figures 3 to 6, and like parts are designated by the same reference characters throughout the drawings.

Figure 1:
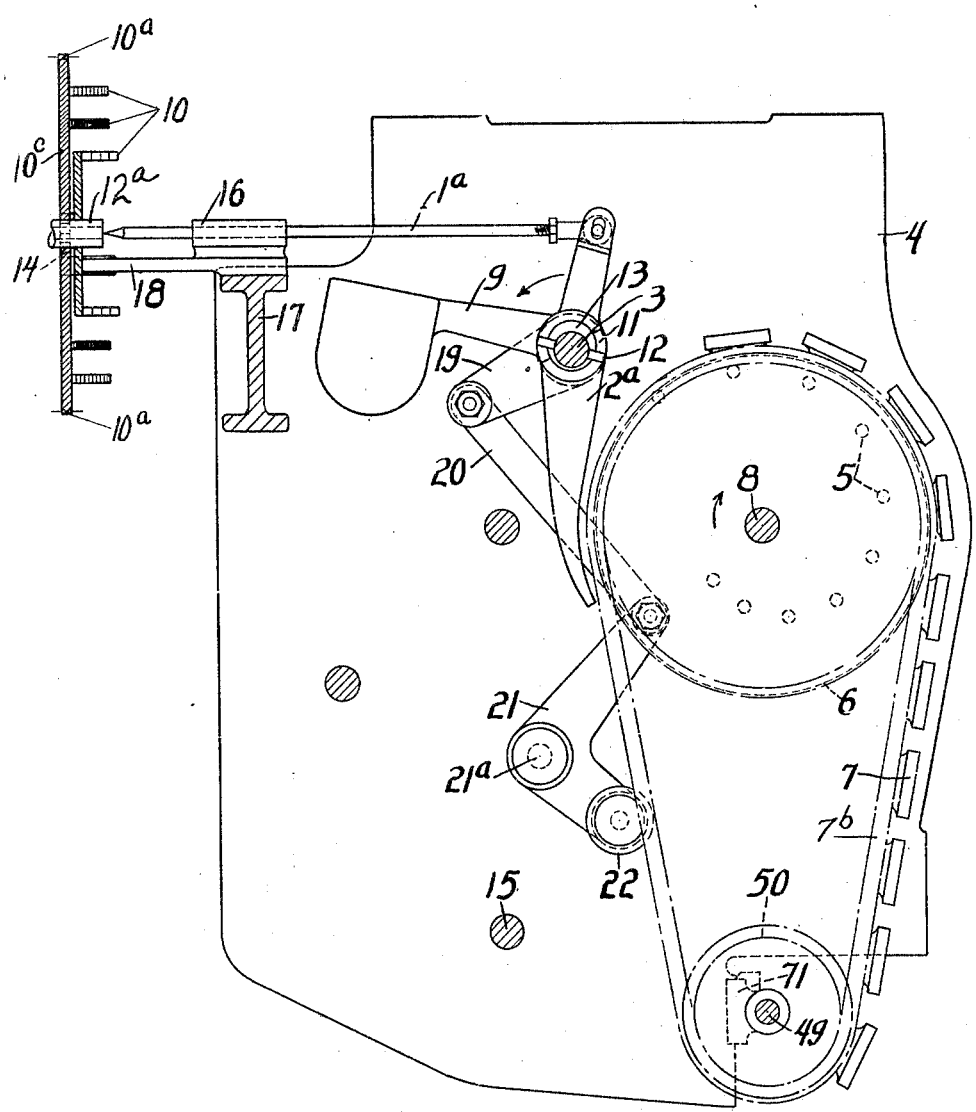
Figure 1 is a sectional side elevation of a marking machine illustrating one embodiment of the invention, the parts being in the inoperative position.
Figure 2:
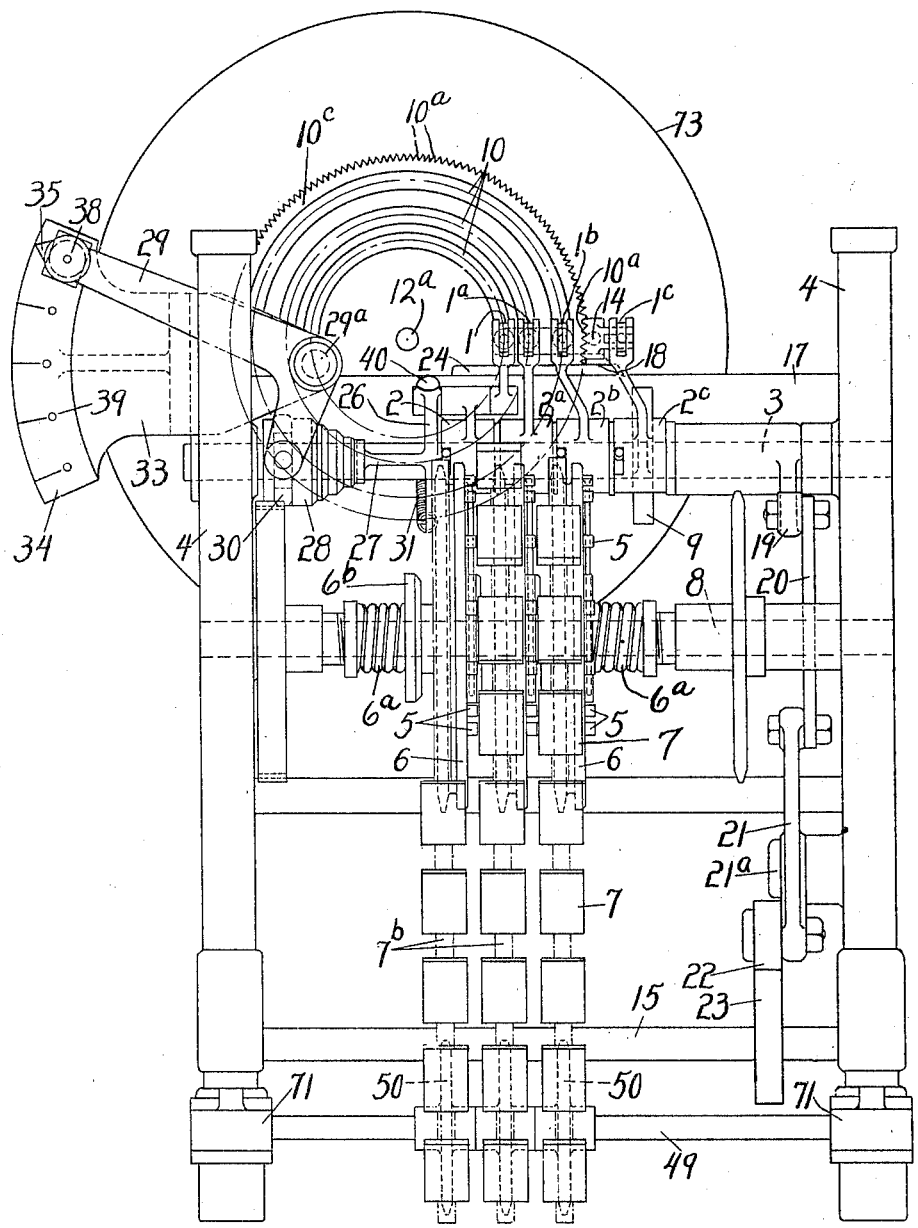
Fig. 2 is a front elevation of the same machine showing a convenient embodiment of the improved compensating means also in the inoperative position.

Referring to Figures 1 and 2, the type setting means shown therein comprise slidable plungers 1, 1a and 1b, and respectively corresponding levers 2, 2a and 2b freely mounted on a carrier shaft 3 rotatably supported in end frames 4 in which the main portion of the stamping mechanism (hereinafter described) is mounted. The plungers are jointed by pin and slot connections to the levers the depending arms of which latter constitute stops or abutments for engagement selectively by a series of projecting pins 5 disposed in the form of a spiral or volute in the usual manner in corresponding sprocket disks 6, around which character carrying member or type elements 7 on flexible carriers 7b are passed and which are frictionally and rotatably driven while supported on a shaft 8. Reading from left to right in Fig. 2, the type elements 7 carry numbers for the tens, the units, and the fractions columns, respectively. The shaft is driven first in the direction of the arrow Fig. 1 to bring the yieldingly driven disks 6 into set positions as determined by pins 5 in contact with the depending arms of the levers 2, 2a, 2b. Subsequently the shaft 8 is rotated in the opposite direction to return the disks 6 to initial position. Upon reference to Fig. 2 it will be observed that the disks 6 are tightly pressed toward each other, and against washers (one of which is shown at 6b) keyed to the shaft 8, by means of springs 6a. Each disk is thus frictionally driven and may be stopped independently of the others by a lever arm acting on one of the pins 5. For a more complete disclosure of the driving means for the type disks reference may be had to United States Letters Patent No. 1,173,312 granted Feb. 29, 1916, upon application of G. A. Schettler. In the present arrangement, each of the levers 2, 2a, 2b has upon it a weighted arm 9 so that when required it can be turned to bring the free end of its depending arm into position to act on the appropriate pin 5 in the adjacent disk 6. The turning movement of each lever 2, 2a, 2b is controlled by its associated plunger 1, 1a, 1b which is operated by the corresponding cam section 10 of a stepped disk 10c arranged to turn with the indicator pointer of a measuring machine (not shown) with which the marking mechanism is associated. For a more complete disclosure of the construction and mode of operation of the cam disk 10c, reference may be had to United States Letters Patent No. 1,114,917, granted Oct. 27, 1914, to G. A. Schettler.

Figure 3:
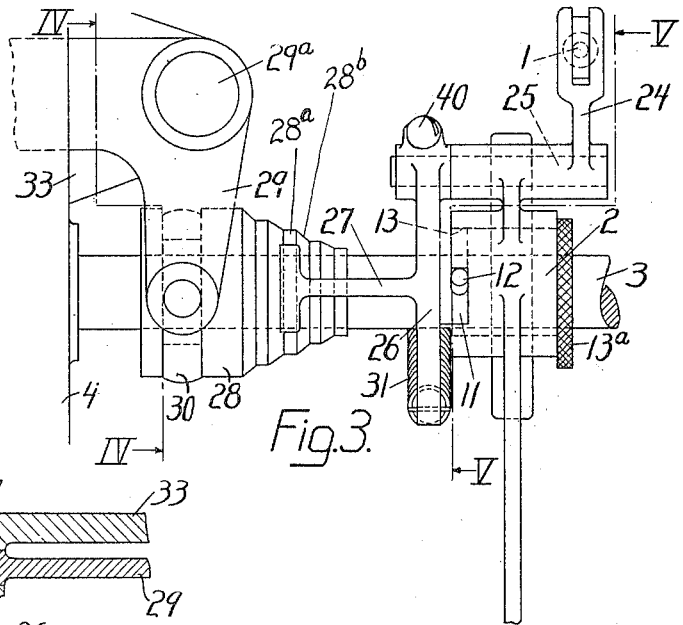
Fig. 3 is a front elevation of the said compensating means, per se, in an operative position.

Since the aforesaid levers 2, 2a, 2b are freely mounted on the shaft 3 for movement to operative position, means are provided for holding said levers and their associated plungers 1, 1a, 1b, in the normal inoperative position, for freeing them for movement to operative position, and for restoring them to initial position. To this end the boss of each lever 2, 2a, 2b, may have circumferential notches or gaps 11 (see also Figure 3) formed in one end of the boss for engagement by a pin 12 fixed radially in the shaft 3 which latter is rotatable in the direction of the arrow (Figure 1) to free the levers so that they can be turned by their weighted arms 9 until arrested by the plungers 1, 1a 1b, the shaft 3 being rotatable in the reverse direction to restore the levers 2, 2a, 2b, to and hold them in inoperative or initial position. The notches or gaps 11 in the lever bosses are made long enough to allow the levers 2, 2a, 2b sufficient free movement to take up the various positions determined by the plungers 1, 1a, 1b.

It will be understood that each of the disks 6 is arrested by the contact of one of its pins 5 with the free end of its associated lever 2, 2a, or 2b, and that such disks, when arrested, bring the required types into position for subsequent printing or marking of the measurement upon the material. In this connection, it is to be understood that the disk 10c with its cam sections 10 moves with the pointer shaft 12a of the indicator 73 mounted on the frame of the combined marking and measuring machine, and that the greater the movement of the disk 10c the greater will be the movement of the disks 6 to bring the higher-numbered type into place to stamp the appropriate characters on the work. In order that the various types, i. e. those of the different elements which correspond, for instance, to the units and tens columns, may be properly aligned, provision is made for adjusting the levers 2, 2a, 2b on the carrier shaft 3 so that the position of arrest of any disk 6 can be moved forward or backward as may be required. To this end each lever instead of being mounted directly on the shaft 3, is mounted upon an eccentric bushing 13 (Figs. 1 and 3) which is free to turn on the shaft. The lever is fastened to the bushing by a set screw (not shown) or other suitable means, and the bushing has a knurled flange 13a to enable it to be turned by hand in the lever after slackening the set screw. The said bushings are made shorter than the lever bosses so as to avoid the radial pins 12 but if desired the bushings may be made as long as the bosses and have corresponding notches or gaps formed therein to accommodate said pins. A further lever 2c, (Figure 2) formed without a depending arm but mounted and operated in a manner similar to the other levers 2, 2a, 2b, is provided on the shaft 3 and connected with it is a plunger 1c fitted with a pawl 14 for engagement with teeth 10a on the periphery of the stepped disk 10c, when the levers are freed by rotation of the shaft 3 as previously described, to lock said disk in the type selecting position. The aforesaid plungers 1, 1a, 1b, may be slidably supported by a bearing 16 mounted on a cross member 17 connecting the end frames 4, and the pawl may be pivotally carried by an arm 18 extending from the said bearing.

The carrier shaft 3 may be operated by a cam or other means. Conveniently said shaft has an arm 19 (Fig. 2) fast thereon and connected by means of a link 20 to a bell crank lever 21 which is fulcrumed at 21a on one of the end frames 4 and fitted with a cam roll 22 for actuation at the required time by a cam 23 (Fig. 2) on the main shaft 15 of the stamping mechanism, the weight of the parts with the assistance of a spring (not shown) serving to keep the roller 22 on the cam 23. In this way the cam 23 operated in properly timed relation serves to move the levers 2, 2a, and 2b to lock the type disks 6 in selected positions and subsequently to release the same and move the levers back to initial position.

It will be understood that, as the type setting mechanism of the marking means is controlled by the measurement indicating means (including the pointer operating means) of the measuring machine, appropriate types will be brought into position for use in accordance with the measurement indicated. However, in certain prior constructions, when a skin, leather or other material having a greater superficial area than the maximum provided for on the dial was put through the measuring machine and the pointer was consequently caused to make more than one revolution (in which case the operator could by calculation tell what the total area was) the types of the stamping mechanism instead of being set to the total were only set in accordance with the actual position of the pointer since it was the position of the pointer which determined the setting of the types. For example, if the dial were divided and marked to indicate a maximum of 30 feet and material having an area of 40 feet were put through the measuring machine the pointer would make one complete revolution and part of another stopping at the 10 mark. Now the operator, knowing that the pointer had made a complete revolution would add 30 (this being the dial's maximum) to the number indicated by the pointer and would thus obtain the total measurement, but the types for stamping the measurement upon the material would be set to show only 10. To overcome this disadvantage and enable the stamping mechanism to be used to mark the correct measurement upon the material in cases where the material measured exceeds in area the maximum provided for on the dial, the present invention provides means whereby the types can be advanced or adjusted to compensate for the difference.

As regards the means adopted for determining the position of the tens type disk 6 in accordance with measurements which are in excess of the capacity of the dial as previously explained, the simplest way is to advance the tens type disk 6 one or more figures as may be required. For instance, by adjusting the tens type disk 6 one or more figures the preliminary complete rotation of the pointer can be provided for and the final indicating position of the pointer will determine the further advance of the tens type to give a correct setting in accordance with the actual area measured.

Under ordinary circumstances if the dial pointer moves to 25, the tens types disk 6 is subsequently arrested with the figure 2 in position for use. Now suppose the dial 73 of the measuring machine indicator to be calibrated to a maximum of 30, and it is desired to measure skins or material exceeding this amount by say another 10 or 20, then by advancing the tens type disk 6 three figures the additional amount will be provided for, and when the pointer stops at 10 or 20 on the dial after having made a complete revolution, the types of the stamping mechanism will, when this mechanism is subsequently used, be set to mark a measurement of 40 or 50 as the case may be. The means for quickly and accurately adjusting the tens type disk 6 will now be described.

Figure 6:
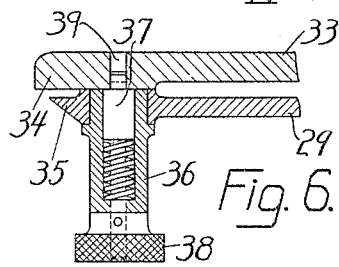
Figure 4:
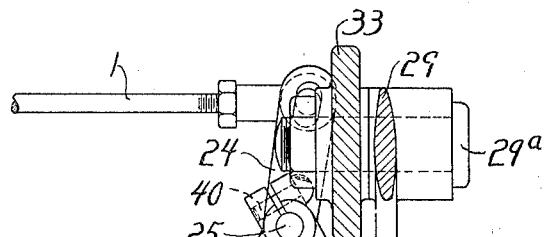
Fig. 4 is a sectional elevation of the same taken on line IV—IV of Fig. 3.
Figure 5:
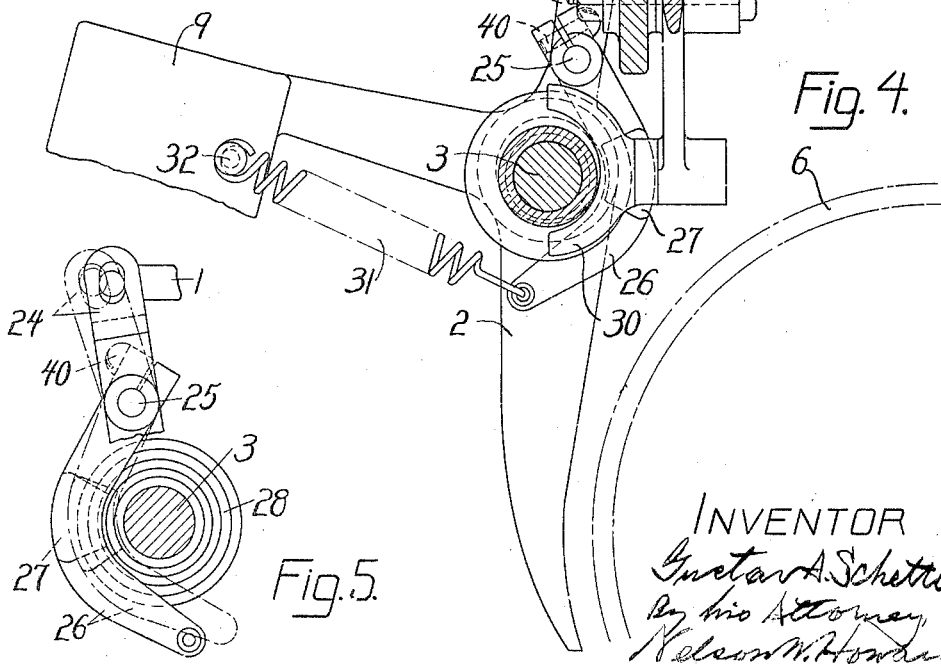
Fig. 5 is a sectional elevation of part of said means taken on line V—V of Fig. 3.
Figure 7:
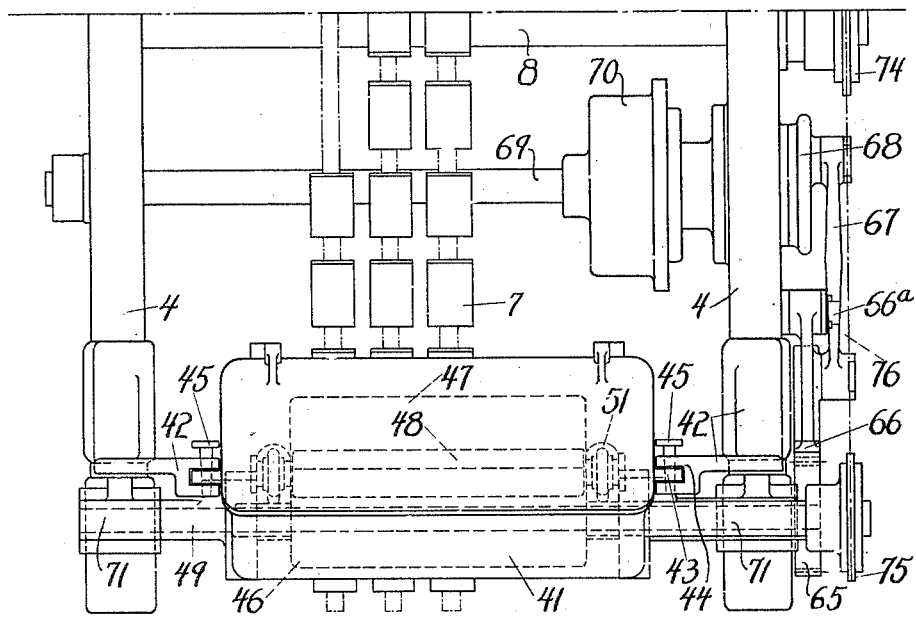
Fig. 7 is a front elevation.

Referring to Figures 2 to 6, in the arrangement illustrated therein the controlling plunger 1 of the lever 2 which serves as a stop for the rotary disk 6 of the tens type element, is connected to said lever in such a manner that the effective distance between the two can be varied. To this end, instead of the plunger 1 being directly connected to the lever 2 it is connected to a small supplementary arm or lever 24 pivotally mounted on said lever by means of an axle or pin 25 so as to be capable of independent movement thereon as well as in company therewith. In other words the upper part of the lever 2 constituted by the supplementary arm or lever 24 is formed separately from the lower part of said lever, whereas in the case of the levers 2a and 2b the upper and lower arms are formed integrally (see lever 2a in Fig. 1). Means are provided to enable the supplementary arm or lever 24 to be changed in position on the main lever 2. For this purpose the arm or lever 24 has fast with it or with its axle 25 an arm 26 (Figs. 3, 4, 5) provided with a lateral projection 27 which has contactual engagement with a stepped cone 28 slidable along the carrier shaft 3. The stepped cone is movable to different positions along the shaft by a hand operated lever 29 (Figs. 2 and 3) fitted with a fork 30 which operates in a circumferential groove in the cone, so as to bring any one of its steps 28a under the projection 27 and thus vary the position of the arm or lever 24 on its main lever 2. The stepped portions of the cone lead from one to another by inclines 28b so that the projection 27 can ride up and down in a ready manner. A spring 31 connected to the arm or lever 24 and to a pin 32 on the weighted arm 9 of the lever 2 holds the projection 27 in contact with the cone. The hand lever 29 (Fig. 2) is fulcrumed by means of a pin 29a upon a bracket 33 attached to the adjacent end frame 4 and may move over a quadrant 34 attached to or formed on said bracket and marked to indicate the different positions. Further said lever 29 is provided with a projection 35 forming a pointer and may be fastened in its different positions along the quadrant by a spring controlled pin, catch or other device. Conveniently and as shown in Figure 6, the lever 29 is fitted with a sleeve 36 in which a spring controlled pin 37, having a knob 38 attached to it, is mounted for projection into one or the other of holes 39 (Figure 2) in the quadrant according to the position of the lever. The release and movement of the hand lever can thus be effected by means of the knob. The effect of moving the stepped cone 28 along the shaft 3 is to turn the supplementary lever 24 on the main lever and thereby alter the point of connection of the plunger 1 in relation to the carrier shaft 3 and the opposite end of the main lever 2. By reason of the aforesaid construction the levers 2 and 24 constitute, in effect, a single lever, so that upon actuation of the shaft 3 said levers 2 and 24 normally rock as a whole to move the plunger 1 connected thereto towards and from the disk 10c. The effect of moving the stepped cone 28 along the shaft 3 is to turn the supplementary lever 24 relatively to the main lever and thereby alter the point of connection of the plunger 1 in relation to said shaft and the opposite end of the main lever. For example, when the cone 28 is moved from the position shown in Figure 2 to that shown in Figure 3, the lever 24 is turned from its initial position indicated by dot and dash lines in Figure 5 to that represented by full lines in the same figure. Thus, according to the adjustment of the cone 28 the plunger 1 is moved to a greater or lesser extent toward the stepped disk 10c, and the lever 2 for arresting the tens type disk 6 is correspondingly advanced as required.

Through the operation of the lever 29, the range of marking operations by the marking machine is widened, through a change in the range of marking by the tens type blocks, adjustment of the lever 29 resulting in a shifting of the range of marking operation by the said tens type blocks.

The arm 26 is shown split and fastened on the axle 25 by a screw 40 so that it and the lever 24 may be adjusted on the lever 2.

In this marking machine, which is especially adapted for use with a measuring machine, the controlling cam disk 10c of the marking machine is mounted upon the shaft 12a which carries and operates the pointer of the indicator means of the measuring machine. It will be recalled that in this type of indicator means the pointer comes to rest after the last measuring element of the measuring machine loses contact with the work as the rear end of the work passes from the field of measuring operations. The pointer of the indicator means and the pointer shaft remain locked in the indicating position of the pointer until they are released at the will of the operator. The cam disk 10c which is operated from the pointer shaft is also locked in position to control selection of appropriate type blocks by which the measurement indicated by the pointer may be stamped on the work by the type blocks. Immediately after the cam disk 10c comes to rest in its type selecting and controlling position the operator throws in the clutch of the marking machine, this operation being immediately followed by a partial rotation of the shaft 3 under control of the cam 23, the shaft moving in the direction of the arrow in Fig. 1.

Figure 8:
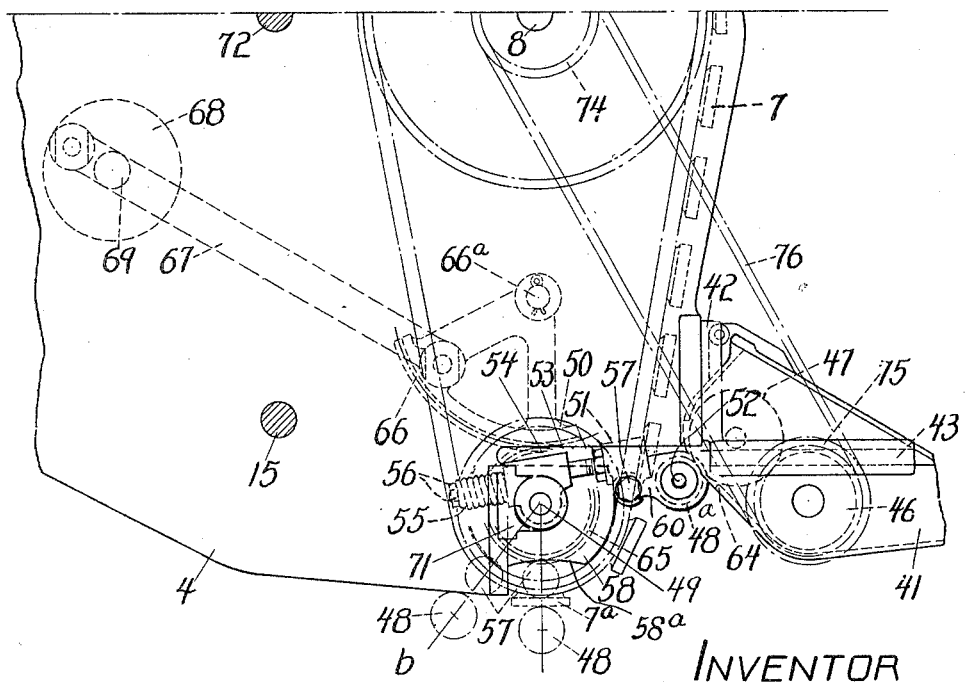
Fig. 8 is a side elevation of a practical embodiment of the improved inking means.

Rotation of the shaft in the direction indicated permits the weighted levers 9 to operate the plungers 1, 1a, 1b and their respectively connected levers 2, 2a, 2b, moving the plungers toward their respective cams 10. Obviously the plungers 1, 1a, and 1b may move to the left in Fig. 1 such distances as may be determined by the cams 10 carried by the cam disk 10c. It is to be understood that the amount of rotation of the cam disk 10c determines the height of each cam at a point opposite to the end of each plunger 1, 1a, 1b. In this way the cams 10 control the setting of the plungers and hence of their connected levers, 2, 2a, 2b. Immediately following the setting of the plungers and their connected levers, the type disks 6 are caused to rotate in the direction of the arrow in Fig. 1, each disk rotating until one of the pins 5 carried thereby strikes the end of its associated lever 2, 2a or 2b, which lever thus acts as a stop for setting the type disk 6 in selected position. Since the type disks 6 are yieldingly driven from the shaft 8 the latter continues to rotate, making a complete revolution, thus insuring that each disk 6 will finally reach selected position. During the rotation of the disks 6 the type elements 7 are moved along therewith and are finally brought into selected position below a type wheel 50, as shown in Fig. 8 of the drawings. While the type blocks are in selected position, a work support (not shown) is caused to lift the work to press it against the type whereby proper characters are marked on the work. The work lifting mechanism may be of the type disclosed in United States Letters Patent No. 1,173,312, granted Feb. 29, 1916 on application of G. A. Schettler, or it may be of the construction and arrangement shown in applicant's copending application, Serial No. 137,136, filed Sept. 22, 1926. If the lot of skins or hides or other pieces of work are of extra large size, so much so that the pointer of the indicator means for the measuring machine must make more than a complete revolution on the dial in order to indicate the area of the individual skins, then the operator will adjust the controlling means for the tens type disk 6 so as to take care of the proper stamping by the tens type blocks by initially advancing the plunger 1 in a direction toward its controlling cam 10 on the cam disk 10c, the result being that the lower end of the connected lever 2 is set a correspondingly greater distance away from the center of the type disk 6 so that it will contact with and serve as an abutment for one of the pins 5 nearer the periphery of the disk 6. This means the disk 6 travels farther in the rotation of the shaft 8 (than it would without the adjustment) before it is brought to rest by contact of one of its pins 5 with the abutment end of the lever 2 and hence that a higher type block is moved into selected position in accordance with the measurement indicated by the pointer. This setting of the plunger 1 is effected by proper manipulation of the lever 29 (Fig. 2) which controls the cone 28. When moved to desired position the lever 29 is secured temporarily in that position by means of the spring controlled pin 37, as already described.

Referring now to Figures 7 to 10, the inking trough 41 is supported at the front of the stamping mechanism by means of brackets 42 attached to the end frames 4. To enable the trough to be removed it is fitted slidably between the brackets for which purpose it is provided on opposite sides with flanges 43 (Fig. 7) which mate with corresponding grooves 44 in the brackets. When in position the trough is fastened by pins 45 passed through corresponding holes in the brackets and flanges, although screws or other suitable means may be employed. The trough may, of course, be otherwise attached so as to be removable. Ink feeding rolls 46 and 47, indicated in outline in Fig. 8, may be mounted in the trough in any convenient manner permitting of easy removal for cleaning purposes.

Figure 9:
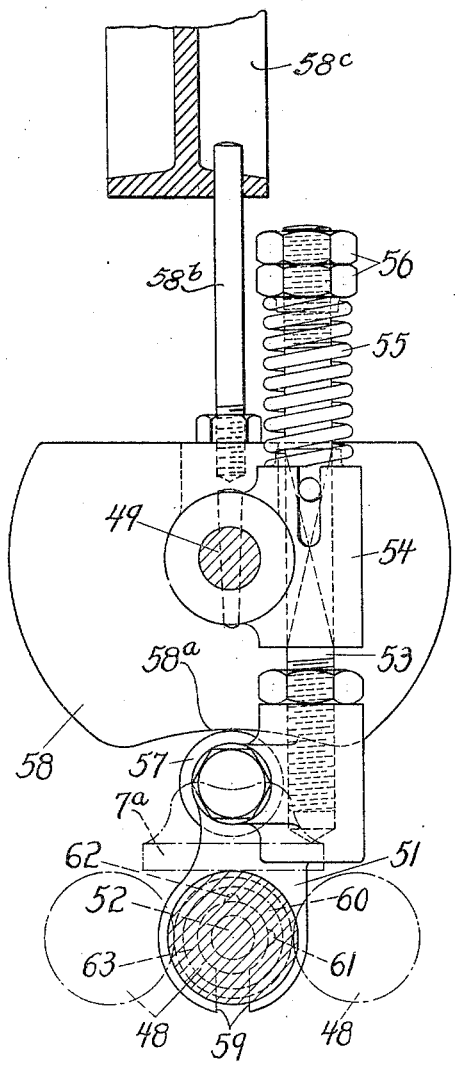
Fig. 9 is a sectional side elevation of the supporting means at one end of the inking roller.

An inking roller 48 is carried at its opposite ends by two arms or levers constructed so as to enable said roller to yield during its movement, a feature of the arrangement being that the roller 48 is controlled by cams which cause it to travel in a substantially straight path in contact with the faces of the set types, as will be presently described. The supporting arms are attached to a shaft 49 on which are rotatably mounted the type wheels 50 which (in conjunction with the disks 6 hereinbefore referred to) carry the type elements 7. This shaft 49 is rocked to actuate the inking roller 48, as will be hereinafter described. Conveniently and as shown, spring-controlled supporting arms or levers are employed and each arm comprises a bearing 51 (see particularly Figures 9 and 10) for the reception of the corresponding end of a spindle 52 which carries the roller 48, and a rod 53 screwed into said bearing 51 and slidable through a bearing 54 pinned on the shaft 49. A compression spring 55 is interposed between the bearing 54 and nuts 56 screwed on the free end of each rod 53. Each bearing 51 has on one side a cam roll 57 which by means of the spring 55 is held in contact with the periphery of an adjacent cam 58 freely mounted on the shaft 49 and held stationary by a connecting bolt 58b, the other end of which is rigidly fastened to a tie bar 58c (Fig. 9). The shape of the cams 58 determines the path of movement of the inking roller 48. As shown in Figures 8 and 9 each cam is made circular with an inwardly curved part 58a (Fig. 9) with which the set or selected types, represented by dot and dash lines 7a are brought into alignment under working condition. The convexly curved parts of the cams 58 hold the roll 48 away from contact with the type blocks so that only the type block in marking position is inked. When the shaft 49 is actuated the inking roller 48 swings concentrically from its initial position a (Figure 8) until the roll 57 reaches the part 58a of the cam 58 whereupon the roller 48 is caused to travel in a substantially straight line in contact with the set types 7a as represented in Figure 9. The movement of the roller is continued to approximately the point b (Figure 8) whereupon it is immediately reversed and returned to its initial position at a.

The inking roller 48 is made adjustable in relation to the cam rolls 58 so that its contact with the types can be regulated, this being accomplished in the illustrated construction, by adjustment of the bearings 51 on the rod 53 (Fig. 9).

Figure 10:
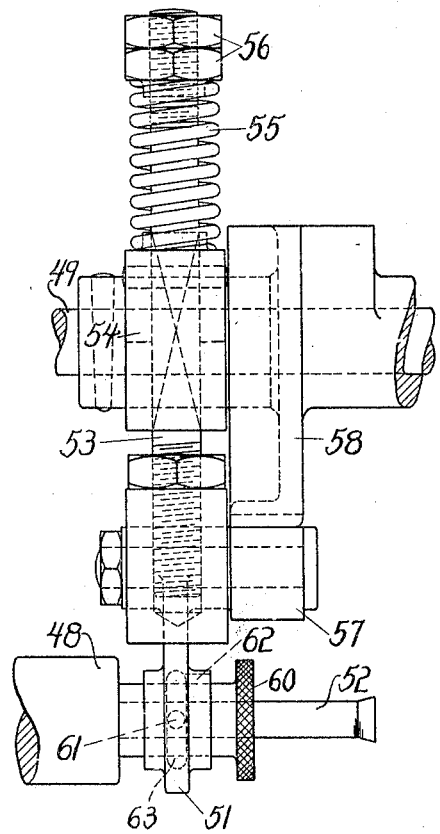
Fig. 10 is a front elevation of the supporting means of Fig. 9 viewed from the right in said figure.

To enable the inking roller 48 to be readily removed from its supporting swing arms, each of the bearings 51 is formed with a slot 59 (Fig. 9) through which the spindle 52 may be passed, and is fitted with a bushing 60 slidable endwise on the spindle 52 into and out of the bearing. The bushings 60 slide along the inking roller spindle 52 and when inserted in the bearings 51 keep said spindle in position. Upon the bushings 60 being withdrawn endwise the spindle 52 will pass through the slots 59 and can thus be removed from the arms. The bushings 60 preferably remain upon the spindle 52 so as to be removable therewith for which purpose the ends of the latter may extend a suitable distance from the bearings and be flared as indicated in Fig. 10 to prevent complete removal of the bushing therefrom. Each bushing 60 has a pin 61 therein and the corresponding bearing 51 is provided with a gap or groove 62 to permit of the passage of the pin into the bearing for engagement with a circumferential groove 63 in the latter to prevent displacement of the bushing under normal working conditions. In its initial position the inking roller 48 engages with the ink feeding roller 47 through an opening 64 in the trough 41. The shaft 49 has fast thereon a gear wheel 65 (Figures 7 and 8) actuated by a toothed segment 66 fulcrumed on a pin 66a in the adjacent end frame 4 and oscillated by means of a connecting link or rod 67 from a crank disk 68 mounted on a shaft 69 which is carried by the end frames 4 and suitably driven through the medium of a single cycle clutch 70 (Fig. 7) of any suitable type rendered operative and inoperative in timed relation to the operative movements of the disks 6, the inking roller 48 moving when the disks 6 move, and continuing in movement to ink the stationary type block in marking position before coming to rest at position a (Fig. 8) to receive application of ink from the roll 47. Thus one complete rotation of the crank disk effects, by means of the link 67, segment 66, and gear wheel 65, the necessary oscillation of the inking roller 48 between ink-receiving and ink-applying positions. The shaft 49 is carried by bearings 71 adjustably mounted on the end frames 4. As shown, the ink feeding roller 46 is driven from the shaft 8 by means of sprocket wheels 74 and 75 and a chain 76 (Fig. 7), the roller 47 being driven frictionally by the roller 46.

Having described my invention, what I claim as new and desire to secure by Letters Patent of the United States is:

1. In a marking machine, means arranged to be controlled by pieces of work so as to be set in various positions by the pieces of work in accordance with the area of each given piece of work, a plurality of marking means, means comprising connections between the first-mentioned means and the plurality of marking means for moving the latter relatively to each other to selected positions to indicate area in accordance with the setting of the first-mentioned means, and means for varying the selecting movement of the marking means.

2. In a marking machine, means adapted to be set in accordance with a characteristic of a given piece of work, marking means comprising members carrying characters, said marking members being arranged for relative movement to provide different combinations of characters, means comprising individual connections between the first-mentioned means and the marking members for moving the latter to selected position in accordance with the setting of the first-mentioned means, and means for varying the connections of only one marking member constructed to leave undisturbed the connections of the other members to widen the range of the selecting movement of the marking means.

3. In a marking machine, means arranged to be set in various positions by pieces of work in accordance with the area of each piece of work, marking means comprising members carrying characters for indicating area and independently movable to selected positions to present an appropriate character or combination of characters for marking the area on each piece of work, connections between the first-mentioned means and the marking means for causing movement of the character-carrying members to positions controlled by the first-mentioned means, and means for changing the connections to change the range of the selecting movement of the marking means.

4. In a marking machine, means adapted to be set in accordance with a given dimension of a piece of work, marking means comprising a series of type blocks, means comprising connections between the marking means and the first-mentioned means for moving the type blocks to present one type block thereof in selected position in accordance with the setting of the first-mentioned means and means under the control of the operator for changing the range of movement of the series of type blocks.

5. In a marking machine, a cam disk adapted to be set in accordance with a given dimension of a piece of work, marking means comprising a series of type blocks, connections between the marking means and the cam disk for controlling the movement of the series of type blocks to place one type block in selected position in accordance with the set position of the cam disk, and manually operable means for controlling the connections to change the movement of the series of type blocks.

6. In a marking machine, means arranged to be set in various positions by pieces of work in accordance with the area of each piece of work, marking means comprising a series of type blocks movable to selected position to present appropriate characters for marking the area on the piece of work, connections between the first-mentioned means and the marking means for controlling the movement of the type blocks in accordance with the set position of the first-mentioned means, and means under the control of the operator for preliminarily adjusting the connections to widen the range of the selecting movement of the marking means.

7. In a marking machine, a cam member adapted to be set in accordance with a given dimension of a piece of work, marking means, means comprising connections between the cam member and the marking means for moving the latter to selected position in accordance with the setting of the cam member, and means under the control of the operator for preliminarily adjusting the connections with respect to the cam member to vary the selecting movement of the marking means.

8. In a marking machine, means adapted to be set in accordance with a given dimension of a piece of work, marking means, means comprising connections between the first-mentioned means and the marking means for moving the latter to selected position in accordance with the setting of the first-mentioned means, said connections comprising a plunger and a two-part lever connected thereto, and means under the control of the operator for moving one part of the lever with respect to the other part to advance the plunger toward the first-mentioned means thereby to control the range of the selecting movement of the marking means.

9. In a marking machine, means adapted to be set in accordance with a dimension of a piece of work, marking means comprising a series of type blocks, means comprising connections between the marking means and the first-mentioned means for moving the type blocks to present one type block thereof in selected position in accordance with the setting of the first-mentioned means, said connections comprising a plunger to contact with the first-mentioned means, a two-part lever connected to the plunger, and means for adjusting the two parts of the lever with respect to each other to vary the position of the plunger and thus control the movement of the series of type blocks toward selected position.

10. In a marking machine, a cam disk adapted to be set in accordance with a given dimension of a piece of work, marking means comprising a plurality of sets of type blocks, connections between the marking means and the cam disk for controlling the movement of the plurality of sets of type blocks to selected position in accordance with the set position of the cam disk, and means for controlling the connections to change the range of movement of one of the sets of type blocks.

11. In a marking machine, a cam disk having a plurality of cams adapted to be set in accordance with a given dimension of a piece of work, marking means comprising a plurality of sets of type blocks, connections between the marking means and the cams of the cam disk for controlling the movement of the sets of type blocks to selected position in accordance with the set position of the cams, and manually operable means for controlling the connections to change the movement of one of the sets of type blocks thereby to change the range of movement of the one set of type blocks with respect to that of the other sets of type blocks.

12. In a marking machine, a cam disk adapted to be set in accordance with a given dimension of a piece of work, marking means comprising a plurality of sets of type blocks, connections between the marking means and the cam disk for controlling the movement of the plurality of sets of type blocks to selected position in accordance with the set position of the cam disk, a manually operable member for controlling the connections to change the movement of one of the sets of type blocks, and a member for indicating to the operator selected positions to which the manually movable member may be moved for controlling said connections.

13. In a marking machine, means adapted to be set in accordance with a given dimension of a piece of work, marking means comprising a plurality of sets of type blocks, one set bearing numerals for the units column and another numeral for the tens column, connections between the marking means and the first-mentioned means for controlling the movement of the type blocks to selected position in accordance with the setting of the first-mentioned means, and means under the control of the operator for varying the movement of the tens type blocks to secure a different range of characters in the tens column than would normally be secured through said connections.

14. In a marking machine, means adapted to be set in accordance with a given dimension of a piece of work, marking means comprising a plurality of sets of type blocks, members for moving the sets of type blocks, connections between the first-mentioned means and the moving members comprising plungers and levers connected one to each plunger, each plunger and its connected lever adapted to be set by the first-mentioned means in position to control one of the moving members, power means for moving the type moving members toward their set position as determined by the plungers and connected levers, and means under the control of the operator for varying the position of one of the plungers and its connected lever with respect to the others and with respect to the first-mentioned means, thereby varying the range of one set of type blocks which may be presented in marking position.

15. In a marking machine, a cam disk having a plurality of cams and adapted to be set in accordance with the area of a given piece of work, marking means comprising a plurality of sets of type blocks, members for moving the sets of type blocks, connections between the cam disk and the moving members comprising plungers and levers connected one to each plunger, each plunger and its connected lever adapted to be set by one of the cams on the cam disk in position to control one of the moving members, power means for moving the type moving members toward their set position as determined by the plungers and connected levers, one of the levers comprising two relatively movable parts of which one part is connected to its associated plunger, and a member under the control of the operator for moving the said lever part and the connected plunger for adjustment of the plunger with respect to the cam disk, whereby the range of movement of the type blocks controlled by the plunger and the two-part lever may be varied.

16. In a marking machine, a cam disk having a plurality of cams and adapted to be set in accordance with the area of a given piece of leather, marking means comprising a plurality of sets of type blocks, members for moving the sets of type blocks, connections between the cam disk and the moving members comprising plungers and levers connected one to each plunger, each plunger and its connected lever adapted to be set by one of the cams on the cam disk in position to control one of the type moving members, power means for moving the type moving members toward their set position as determined by the plungers and connected levers, one of the levers comprising two relatively movable parts of which one part is connected to its associated plunger, means for adjusting the plunger part of the lever to position the plunger relatively to its cam on the cam disk, and means for operating the levers and plungers to bring them into contact with their respective cams on the cam disk whereby they become set in position to control the type moving members.

17. In a marking machine, means adapted to be set in accordance with a given dimension of a piece of work, marking means comprising a plurality of sets of type blocks, members for moving the sets of type blocks, connections between the first-mentioned means and the moving members comprising plungers and levers connected one to each plunger, each plunger and its connected lever adapted to be set by the first-mentioned means in position to control one of the moving members, power means for moving the type moving members toward their set position as determined by the plungers and connected levers, one of the levers comprising two relatively movable parts of which one part is connected to its associated plunger, a cone member for adjusting the plunger part of the lever thereby causing the plunger to be preliminarily adjusted with respect to the first-mentioned means, and means for operating all of the plungers and levers to move them toward the first-mentioned means so that they become set in their respective positions to control the type moving members.

18. In a marking machine, a cam disk adapted to be set in accordance with a given dimension of a piece of work, marking means comprising a plurality of sets of type blocks, a type disk for each set of blocks, a plurality of pins on each disk, operative connections between the cam disk and the type disks controlled selectively by the pins on the disks for controlling the movement of the plurality of sets of type blocks to selected position in accordance with the set position of the cam disk, and a manually operable means for controlling the connections to change the movement of one of the sets of type blocks.

19. In a marking machine, a cam disk adapted to be set in accordance with a given dimension of a piece of work, marking means comprising a plurality of sets of type blocks, a type disk for each set of blocks, a plurality of pins on each disk, a lever associated with each type disk and adapted to contact selectively with the pins thereon, a plunger connected with each lever and adapted to contact with the cam disk for controlling the movement of the plurality of sets of type blocks to selected position in accordance with the set position of the cam disk, and a manually operable member for controlling one of the levers and its associated plunger to change the range of movement of one of the sets of type blocks.

20. In a marking machine, a cam disk adapted to be set in accordance with a given dimension of a piece of work, marking means comprising a plurality of sets of type blocks, a type disk for each set of blocks, a plurality of pins on each disk, a lever associated with each type disk and adapted to contact selectively with the pins thereon, a plunger connected with each lever and adapted to contact with the cam disk for controlling the movement of the plurality of sets of type blocks to selected position in accordance with the set position of the cam disk, a manually operable member for adjusting one of the levers with respect to the plurality of pins on the type disk associated with the lever whereby upon operation of the disk it comes to set position through contact of one of the pins with the end of the said one of the levers, and means for operating the disk to move its associated set of type blocks to selected marking position.

21. In a marking machine, a cam disk adapted to be set in accordance with a given dimension of a piece of work, marking means movable to selected position to present appropriate characters for marking the dimension on the piece of work, connections between the cam disk and the marking means for controlling the latter from the former, a shaft for operating the connections, and means controlled from said shaft for locking the cam disk in set position.

22. In a marking machine, a cam disk adapted to be set in accordance with a given dimension of a piece of work, a plurality of sets of type blocks each comprising an endless carrier for the blocks, a type disk for each set of blocks, type wheels about each of which a type carrier passes, a shaft upon which the type wheels are rotatably mounted, operative connections between the cam disk and the type disks for controlling the movement of the plurality of sets of type blocks so that the latter may be moved to selected positions on the type wheels in accordance with the set position of the cam disk, and an inking member mounted on the type wheel shaft for applying ink to the type blocks which have reached selected positions on the type wheels.

23. In a marking machine, a cam disk adapted to be set in accordance with a given dimension of a piece of work, a plurality of sets of type blocks each comprising an endless carrier for the blocks, a type disk for each set of blocks, type wheels about each of which a type carrier passes, a shaft upon which the type wheels are rotatably mounted, operative connections between the cam disk and the type disks for controlling the movement of the plurality of sets of type blocks so that the latter may be moved to selected positions on the type wheels in accordance with the set position of the cam disk, means for oscillating the type wheel shaft, and an inking member carried by the shaft for applying ink to the type blocks in selected positions on the type wheels during oscillation of the shaft.

24. In a marking machine, a cam disk adapted to be set in accordance with a given dimension of a piece of work, a plurality of sets of type blocks each comprising an endless carrier for the blocks, a type disk for each set of blocks, type wheels about each of which a type carrier passes, a shaft upon which the type wheels are rotatably mounted, operative connections between the cam disk and the type disks for controlling the movement of the plurality of sets of type blocks so that the latter may be moved to selected positions on the type wheels in accordance with the set position of the cam disk, means for oscillating the type wheel shaft, stationary cam members supported by the type wheel shaft, and an inking member fixedly mounted on the type wheel shaft and arranged to be operated thereby for applying ink to the type blocks set in selected positions on the type wheels, said inking member being caused to move under control of the cam members in a substantially straight line while applying ink to the type blocks.

25. In a marking machine, a cam disk adapted to be set in accordance with a given dimension of a piece of work, a plurality of sets of type blocks each comprising an endless carrier for the blocks, a type disk for each set of blocks, type wheels about each of which a type carrier passes, a shaft upon which the type wheels are rotatably mounted, operative connections between the cam disk and the type disks for controlling the movement of the plurality of sets of type blocks so that the latter may be moved to selected positions on the type wheels in accordance with the set position of the cam disk, means for oscillating the type wheel shaft comprising a gear fastened to the shaft and a power driven segmental gear arranged in mesh with the gear on the shaft, stationary cam members supported by the shaft, arms fixedly carried by the shaft, and an inking member carried by the arms so that upon oscillation of the shaft the inking member is caused to move over the surface of the type blocks set in selected positions on the type wheels, said cam members being operative to cause the inking member to move in a straight line across the surface of the type blocks.

In testimony whereof I have signed my name to this specification.

GUSTAV A. SCHETTLER.